US008588619B2

(12) United States Patent  (10) Patent No.: US 8,588,619 B2
Peter et al.  (45) Date of Patent: Nov. 19, 2013

(54) OPTICAL TELEMETRY NETWORK

(75) Inventors: Andreas Peter, Niedersachsen (DE); John D. Macpherson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 400 days.

(21) Appl. No.: 12/858,604

(22) Filed: Aug. 18, 2010

(65) Prior Publication Data
US 2011/0044697 A1   Feb. 24, 2011

Related U.S. Application Data

(60) Provisional application No. 61/234,845, filed on Aug. 18, 2009.

(51) Int. Cl.
H04B 10/12 (2011.01)

(52) U.S. Cl.
USPC .......................................... 398/141; 398/105

(58) Field of Classification Search
USPC ............... 398/9, 16, 25, 31, 33, 38, 104, 151, 398/171, 140, 141, 153, 105, 20, 13
See application file for complete search history.

(56) References Cited

U.S. PATENT DOCUMENTS

| 4,700,262 | A | 10/1987 | Inculet |
| 6,670,880 | B1 | 12/2003 | Hall et al. |
| 7,193,526 | B2 | 3/2007 | Hall et al. |
| 7,291,303 | B2 | 11/2007 | Hall et al. |
| 7,299,867 | B2 * | 11/2007 | Hall et al. ................... 166/242.1 |
| 7,400,262 | B2 | 7/2008 | Chemali et al. |
| 7,475,593 | B2 | 1/2009 | Odom |
| 7,485,865 | B2 | 2/2009 | Medley et al. |
| 7,498,509 | B2 * | 3/2009 | Brotzell et al. ............. 174/21 R |
| 7,528,736 | B2 * | 5/2009 | Hall et al. .................. 340/854.9 |
| 2005/0024231 | A1 | 2/2005 | Fincher et al. |
| 2009/0038849 | A1 * | 2/2009 | Braden et al. .................... 175/40 |
| 2009/0166087 | A1 | 7/2009 | Braden et al. |

OTHER PUBLICATIONS

Fischer, "Real real-time drill pipe telemetry: A step-change in drilling". World Oil, vol. 224, No. 10. Oct. 2003 [retrieved on Apr. 21, 2011] Retrieved fromt he internet:URL http://www.worldoil.com/October-2003-Real-real-time-drill-pipe-telemetry-A-step-change.
Notification of Transmittal of the International Search Report and the Written Opinion of the International Searching Authority, or the Declaration; PCT/US2010/045884; Mar. 29, 2011.

* cited by examiner

*Primary Examiner* — M. R. Sedighian
(74) *Attorney, Agent, or Firm* — Cantor Colburn LLP

(57) ABSTRACT

An apparatus for providing communications between a first device disposed at a tubular and a second device, the tubular having tubular sections and being configured to be disposed in a borehole penetrating the earth, the apparatus including: a first optical coupler configured to be coupled to a first tubular section and configured to be in optical communication with the first device using a first optical transmission medium disposed at the first tubular section; and a second optical coupler configured to be coupled to a second tubular section and configured to be in optical communication with the second device using a second optical transmission medium disposed at the second tubular section; wherein the first optical coupler is configured to be perimetrically disposed about the second optical coupler to be in communication with the second optical coupler to provide the communications between the first device and the second device.

21 Claims, 21 Drawing Sheets

OPTICAL TELEMETRY NETWORK

CROSS-REFERENCE TO RELATED APPLICATIONS AND PRIORITY CLAIM

This application claims the benefit of U.S. Provisional Application Ser. No. 61/234,845, entitled "OPTICAL TELEMETRY NETWORK", filed Aug. 18, 2009, under 35 U.S.C. §119(e), which is incorporated herein by reference in its entirety.

BACKGROUND OF THE INVENTION

1. Field of the Invention

The invention disclosed herein relates to bi-directional communications between devices disposed in a drill string and a processing system disposed at the surface of the earth using an optical telemetry network.

2. Description of the Related Art

Exploration and production of hydrocarbons generally requires a borehole be drilled into earth formations, which may contain reservoirs of the hydrocarbons. To efficiently utilize drilling resources, many types of measurements are usually performed within the borehole.

The measurements can be of properties of the earth formations, properties of the borehole, properties of the fluid within the borehole, and a state of a drilling apparatus drilling the borehole. These measurements are often performed while the borehole is being drilled using sensors disposed at the drilling apparatus. Some of these measurements would be particularly useful to a drilling operator or a petro-analyst if they could be provided in real time. For example, knowledge of the earth formation being penetrated by the drilling apparatus can be used by the drilling operator to geosteer or guide the drilling apparatus in a more desirable path to more efficiently drill the borehole.

Unfortunately, it is difficult to transmit measurements to the surface of the earth in real time because of the harsh environment in the borehole and the dynamics of the drilling process. Similarly, transmitting information from the surface of the earth to sensors or devices disposed at the drilling apparatus downhole is also difficult.

Therefore, what are needed are techniques for communicating between devices disposed at a drilling apparatus downhole and the surface of the earth. Preferably, the techniques provide communications at times short enough to enable personnel at the surface of the earth to make timely drilling decisions and to maintain control of dowhhole instruments and devices.

BRIEF SUMMARY OF THE INVENTION

Disclosed is an apparatus for providing communications between a first device disposed at a tubular and a second device, the tubular having tubular sections and being configured to be disposed in a borehole penetrating the earth, the apparatus including: a first optical coupler configured to be coupled to a first tubular section and configured to be in optical communication with the first device using a first optical transmission medium disposed at the first tubular section; and a second optical coupler configured to be coupled to a second tubular section and configured to be in optical communication with the second device using a second optical transmission medium disposed at the second tubular section; wherein the first optical coupler is configured to be perimetrically disposed about the second optical coupler to be in communication with the second optical coupler to provide the communications between the first device and the second device.

Also disclosed is an apparatus for providing communications between a first device disposed at a tubular and a second device, the tubular having tubular sections and being configured to be disposed in a borehole penetrating the earth, the apparatus includes: a first tubular section; a second tubular section; a first optical coupler disposed at the first tubular section and configured to be in optical communication with the first device using a first optical transmission medium disposed at the first tubular section; and a second optical coupler disposed at the second tubular section and configured to be in optical communication with the second device using a second optical transmission medium disposed at the second tubular section; wherein the first optical coupler is configured to be perimetrically disposed about the second signal transmission coupler to be in communication with the second optical coupler to provide the communications between the first device and the second device.

Further disclosed is a method for providing communications between a first device disposed at a tubular and a second device, the tubular having tubular sections and configured to be disposed in a borehole penetrating the earth, the method includes: receiving a signal from one of the first device and the second device; transmitting the signal using a first optical transmission medium disposed at a first tubular section; transmitting the signal from the first optical transmission medium to a second optical transmission medium disposed at a second tubular section using a first optical coupler disposed at the first optical transmission medium and a second optical coupler disposed at the second tubular; and transmitting the signal from the second optical transmission medium to one of the first and second device not sending the signal to provide the communications between the first device and the second device; wherein one of the optical couplers is configured to be perimetrically disposed about the other optical coupler to provide the communications of the signal between the optical couplers.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings, wherein like elements are numbered alike, in which:

DETAILED DESCRIPTION OF THE INVENTION

Figure 1:
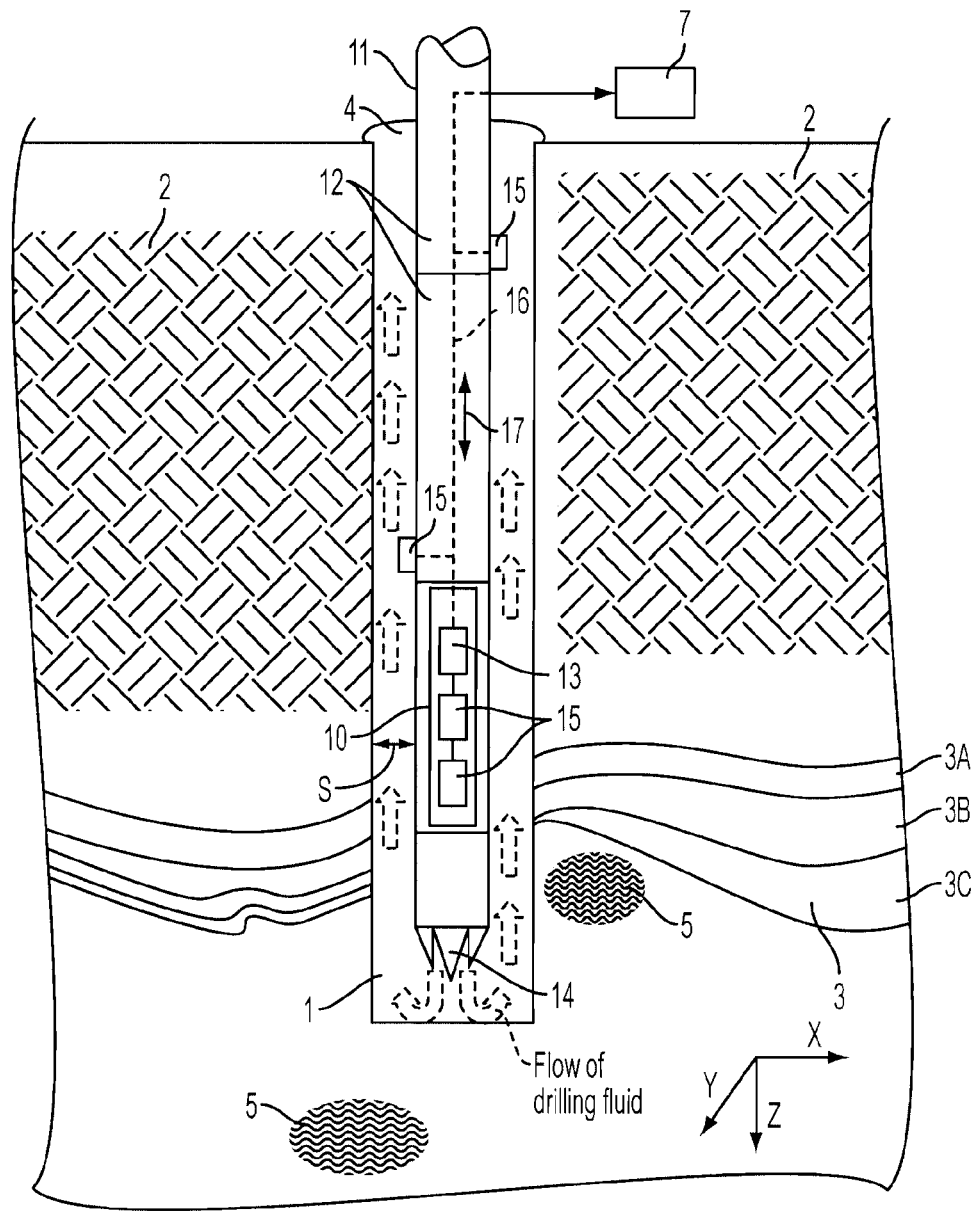
FIG. 1 illustrates an exemplary embodiment of a logging tool disposed at a drill string in a borehole penetrating the earth.

Disclosed are techniques for bi-directional communication in real time between at least one device disposed at a drill string that is disposed in a borehole penetrating the earth and a processing system disposed at the surface of the earth. The techniques, which include apparatus and method, call for communicating an optical signal using an optical telemetry network. The optical signal is transmitted in the optical telemetry network via an optical transmission medium such as an optical fiber that may be included in a fiber optic cable. The fiber optic cable can include one or more optical fibers. Alternatively, the optical transmission medium can be provided with a certain shape such as a tubular.

Each optical fiber is generally clad with a reflective material so that a light (or optical) signal is reflected along the length of the optical fiber. In one embodiment, the optical fiber is a plastic material. In general, a laser or light-emitting diode is used to generate the light signal and a photodetector is used to receive the light signal.

Because the drill string is assembled from sections of drill pipe, in one embodiment, each drill pipe section contains a fiber optic cable located within. As the drill string generally provides an internal pathway for drilling mud to flow to a drill bit at the distal end of the drill string, the fiber optic cable is protected and supported by a conduit attached to the inside of each section of drill pipe in one embodiment. In another embodiment, the fiber optic cable itself is armored and attached to the inside of the drill pipe. In another embodiment, the fiber optic cable is embedded within drill pipe coatings of the inner pipe wall. In another embodiment, the fiber optic cable is contained within grooves or cavities formed within the wall of the drill pipe. The drill pipe can be conventional drill pipe or double-shouldered drill pipe.

In addition to the fiber optic cable, the optical telemetry network includes various interfaces, couplers, and repeaters necessary to communicate between the processing system and the at least one device. For example, the techniques provide a device interface to convert a signal, such as an electrical signal, from a device into an optical signal suitable for transmission with the fiber optic cable. Similarly, a processor interface is provided to receive the optical signal from the fiber optic cable while the drill string is rotating and to convert the optical signal into an electrical signal suitable for being processed by a processing system.

Signal transfer, in one embodiment, between the optical signal in the fiber optic cable and the electrical signal used by the processing system is accomplished using a radio frequency (RF) interface. The RF interface can include, as a non-limiting embodiment, an optical/RF converter disposed in the drill pipe and a transceiver disposed external to the drill pipe. For example, the optical signal may be converted to an RF signal in the drill pipe and transmitted to the transceiver external to the drill pipe. The conversion is performed by the optical/RF converter. The transceiver will receive the RF signal and convert the RF signal to an electrical signal suitable for communication with the processing system. Similarly, the transceiver will receive the electrical signal from the processing system and transmit an RF signal to the optical/RF converter in the drill pipe. The optical/RF converter in turn will convert the RF signal to the optical signal for transmission in the fiber optic cable and, therefore, also acts as a repeater, boosting strength of the signal to compensate for attenuation in signal amplitude.

As stated above, the drill string is assembled from sections of drill pipe. Thus, each end of a drill pipe includes a signal coupler for transmitting a signal from one section of drill pipe to an attached section of drill pipe. In one embodiment, the signal coupler is configured to enable the optical signal in the fiber optic cable in one section of drill pipe to enter the fiber optic cable in the attached section of drill pipe. In another embodiment, the signal coupler is configured to convert the optical signal in one section of drill pipe to an electrical signal that can be transmitted to a mating coupler in the attached section of drill pipe where the electrical signal is then converted to the optical signal for transmission in the fiber optic cable. In this embodiment, the electrical signal can be transmitted by direct contact, by induction coupling, or by electromagnetic transmission.

The optical telemetry network can be configured to provide communications to a plurality of downhole communicative devices. In addition, the network can provide communications between the plurality of downhole communicative devices. In one embodiment, any one device can be configured to receive a signal from another device and transmit that signal to the network.

The communicative devices can include sensors for performing measurements. The measurements can be of properties of an earth formation penetrated by the borehole, properties of the borehole, or properties or conditions of the drill string. In addition, the communicative devices can include actuators or devices configured to perform designated functions upon receipt of a command.

Before the techniques are discussed in detail, certain definitions are presented. The term "signal" relates to information conveyed by a form of energy. Non-limiting examples of the form of energy include light, electricity, or electromagnetic waves. The term "real time" relates to very fast communications that provide communications over time intervals that are short enough to accomplish a desired task while drilling operations are being conducted.

For perspective, aspects of equipment where the techniques may be used are presented in FIG. 1. Refer now to FIG. 1 where aspects of an apparatus for drilling a wellbore 1 (also referred to as a "borehole") are shown. As a matter of convention, a depth of the wellbore 1 is described along a Z-axis, while a cross-section is provided on a plane described as parallel to the Z-axis.

In this example, the wellbore 1 is drilled into the Earth 2 using a drill string 11 driven by a drilling rig (not shown) which, among other things, provides rotational energy and pressurized drilling fluid and controls the downward force at the drill bit. The wellbore 1 generally traverses sub-surface materials, which may include various formations 3 (shown as formations 3A, 3B, 3C). One skilled in the art will recognize that the various geologic features as may be encountered in a subsurface environment may be referred to as "formations," and that the array of materials down the borehole (i.e., downhole) may be referred to as "sub-surface materials." That is, the formations 3 are formed of sub-surface materials. Accordingly, as used herein, it should be considered that while the term "formation" generally refers to geologic formations, and "sub-surface material," includes any materials, and may include materials such as fluids, gases, liquids, and the like.

The drill string 11 includes lengths of drill pipe 12 which drive a drill bit 14. In this example, the drill bit 14 also provides a flow of a drilling fluid 4, such as drilling mud. The drilling fluid 4 is often pumped to the drill bit 14 through the drill pipe 12, where the fluid exits into the wellbore 1. This results in an upward flow of drilling fluid 4 within the annulus of the wellbore 1. The upward flow generally cools the drill string 11 and components thereof, carries away cuttings from the drill bit 14 and prevents blowout of pressurized hydrocarbons 5. The drill pipe 12 may be referred to as one example of a tubular. The tubular may have a circular or non-circular cross-section.

The drilling fluid 4 (also referred to as "drilling mud") generally includes a mixture of liquids such as water, drilling fluid, mud, oil, gases, and formation fluids as may be indigenous to the surroundings. Although drilling fluid 4 may be introduced for drilling operations, use or the presence of the drilling fluid 4 is neither required for nor necessarily excluded from well logging operations. Generally, a layer of materials will exist between an outer surface of the drill string 11 and a wall of the wellbore 1. This layer is referred to as a "standoff layer," and includes a thickness, referred to as "standoff, S."

The drill string 11 generally includes equipment for performing "measuring while drilling" (MWD) or "logging while drilling" (LWD). Performing MWD or LWD generally calls for operation of a logging instrument 10 that is incorporated into the drill string 11 and designed for operation while drilling. Generally, the MWD logging instrument 10 is coupled to an electronics package, which is also on board the drill string 11, and therefore referred to as "downhole electronics 13." Generally, the downhole electronics 13 provides for at least one of operational control and data analysis. Often, the MWD logging instrument 10 and the downhole electronics 13 are coupled to topside equipment 7. The topside equipment 7 may be included to further control operations, provide greater analysis/processing capabilities as well as data logging and the like.

Each length of drill pipe 12 contains an optical transmission medium 16 that provides for communications between the downhole electronics 13 and the topside equipment 7. In one embodiment, the optical transmission medium 16 may be the fiber optic cable referred to herein as the fiber optic cable 16. While not shown, other downhole electronics 13 may be coupled by the fiber optic cable 16 to the optical telemetry network. In the embodiment of FIG. 1, the downhole electronics 13 represent any communicative device for which the fiber optic cable 16 provides communications.

Generally, data from the MWD/LWD apparatus provide users with enhanced capabilities. For example, data made available from MWD/LWD evolutions may be useful as inputs to geosteering of the drill string 11 and the like. Geosteering is but one example of the benefit of real time communications provided by the optical telemetry network.

Generally, the logging instrument 10 includes apparatus for performing measurements "downhole" or in the wellbore 1. Such apparatus include, for example, a variety of communicative devices 15. Exemplary communicative devices 15 may include sensors, actuators, or analysis equipment such as a spectrometer. Each device 15 may communicate with downhole electronics 13, other devices 15 and the topside equipment 7.

Figure 2:
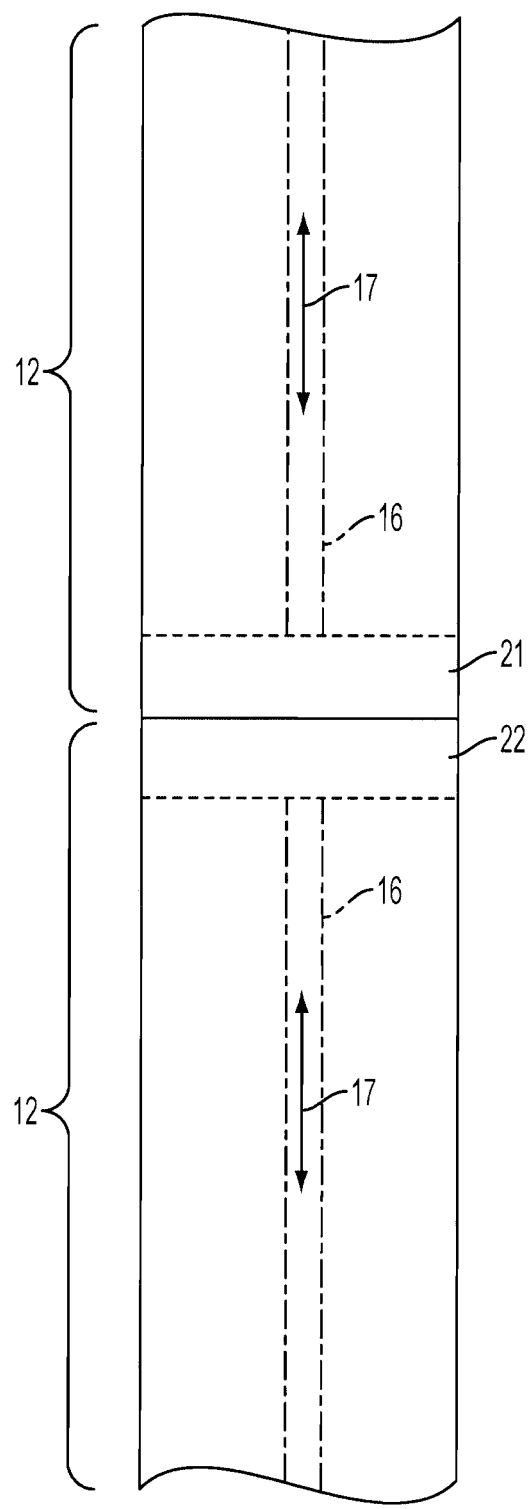
FIG. 2 depicts aspects of a section of drill pipe containing a fiber optic cable.

Reference may now be had to FIG. 2. FIG. 2 depicts aspects of two sections of the drill pipe 12 coupled together. Each section of the drill pipe 12 contains the fiber optic cable 16 (i.e., a length of fiber optic cable). As shown in FIG. 2, the fiber optic cable 16 is used as a medium for bi-directional transmission of the optical signal 17. To enable transmission of the optical signal 17 from one fiber optic cable 16 in one section of the drill pipe 12 to another fiber optic cable 16 in an adjacent section of drill pipe 12, each end of joined sections of drill pipe 12 has a coupling. Each coupling is configured to mate to the coupling at the adjacent section of drill pipe 12. As shown in FIG. 2, the upper section of the drill pipe 12 includes a first coupler 21 coupled to a second coupler 22 included with the lower section of the drill pipe 12.

Figure 3:
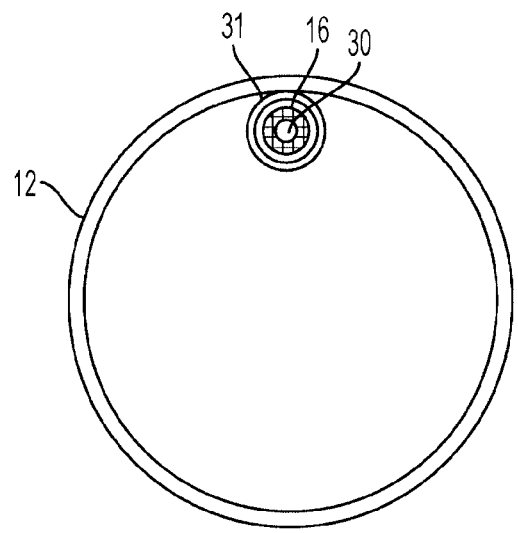
FIG. 3 illustrates a cross-sectional view of the drill pipe containing the fiber optic cable.

Reference may now be had to FIG. 3. FIG. 3 illustrates a cross-sectional view of one section of the drill pipe 12 containing the fiber optic cable 16. The fiber optic cable in the embodiment of FIG. 3 includes an optical fiber 30. In order to protect the fiber optic cable 16 from the environment internal to the drill pipe 12, the fiber optic cable 16 is disposed in a conduit 31 as shown in the embodiment of FIG. 3. The conduit 31 is secured to the inside of the drill pipe 12. In another embodiment, the fiber optic cable 16 can include an armored jacket and, thus, not require the protection that a conduit affords.

Figure 4:
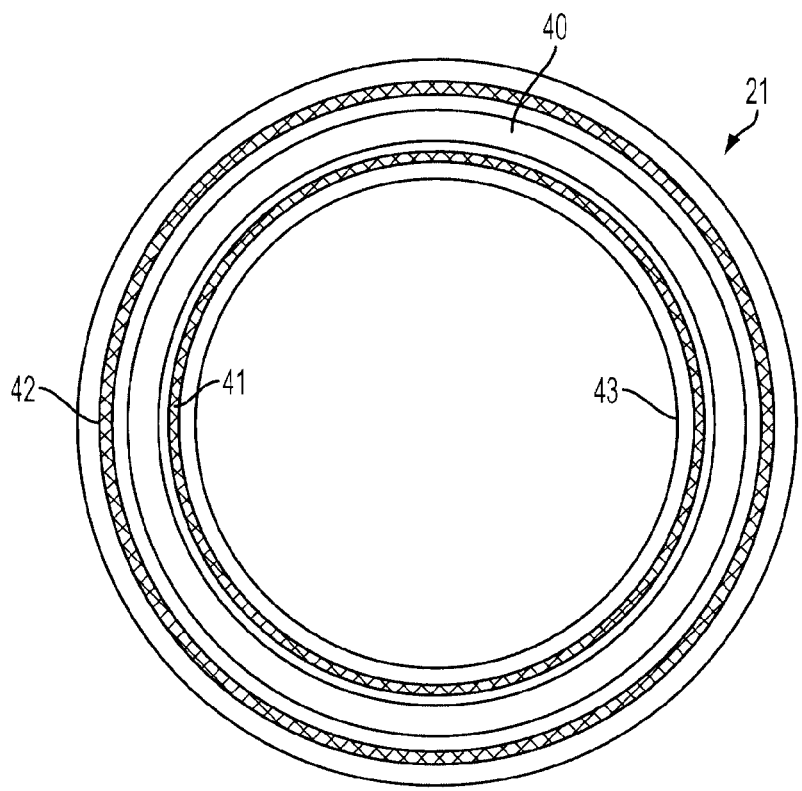
FIG. 4 illustrates a bottom view of a first coupler disposed at an end of the section of drill pipe.

Reference may now be had to FIG. 4. FIG. 4 illustrates a bottom view of an exemplary embodiment of the first coupler 21. The first coupler 21 includes a first flange 43. The flange 43 shown in FIG. 4 has a flat surface configured to mate with a similar flange at the second coupler 22. Disposed in the flange 43 is a first circular signal transmission coupler 40 that is concentric to the drill pipe 12. The first circular signal transmission coupler 40 is coupled to the optical fiber 30. The first circular signal transmission coupler 40 is configured to optically couple with a similar circular signal transmission coupler at the second circular signal transmission coupler 22 to transmit the optical signal 17. In order to prevent contamination of the optical coupling provided by the circular signal transmission couplers, an inner seal 41 and an outer seal 42 are disposed at the flange 43. An attachment device, such as threads for example, may be provided either internal or external to the flange 43 to couple the couplers and/or the drill pipe sections.

Figure 5:
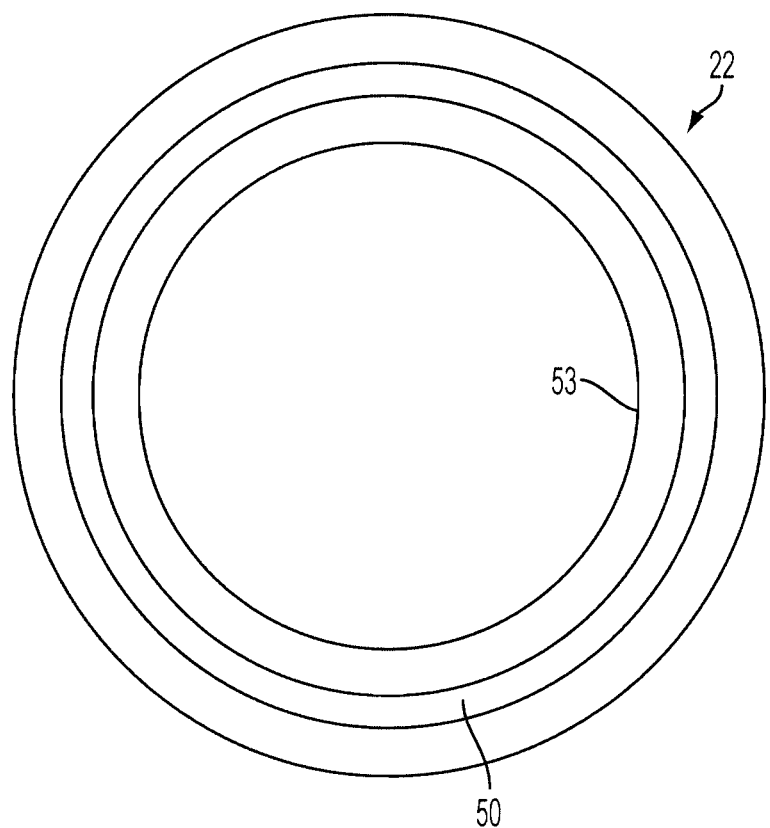
FIG. 5 illustrates a top view of a second coupler configured to mate with the first coupler.

Reference may now be had to FIG. 5. FIG. 5 illustrates a top view of an exemplary embodiment of the second coupler 22. The second coupler 22 includes a second flange 53. The second flange 53 shown in FIG. 5 has as a flat surface that is configured to mate with the first flange 43 and to provide a sealing surface for the seals 41 and 42. Disposed in the flange 53 is a second circular signal transmission coupler 50 coupled to the optical fiber 30 in the section of drill pipe that includes the second coupler 22. The second circular signal transmission coupler 50 is configured to optically couple to the first circular signal transmission coupler 40. The second coupler 22 also includes an attachment device that is configured to mate with the attachment device at the first coupler 21. In one embodiment, each attachment device includes a threaded connection.

Figure 6:
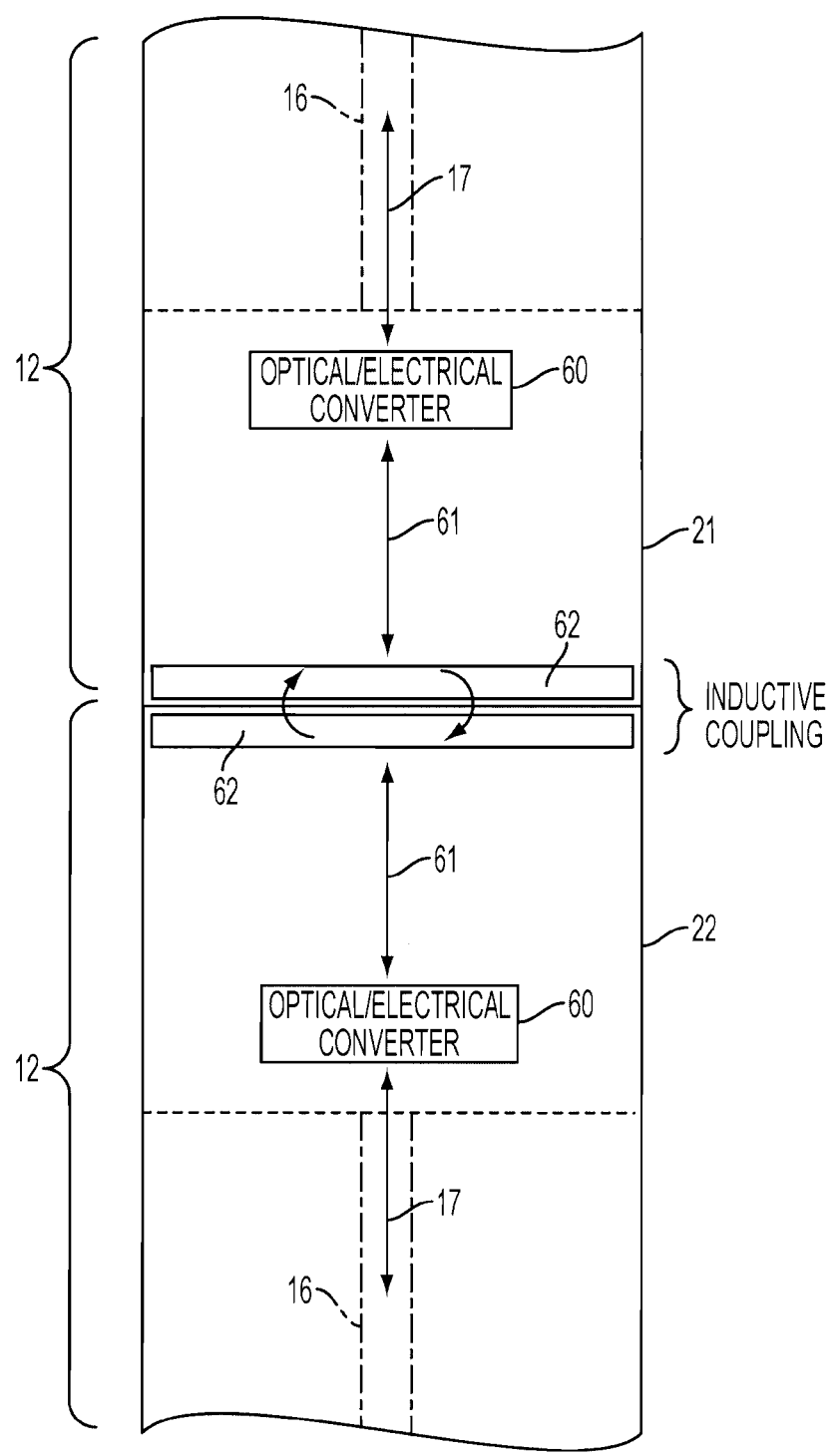
FIG. 6 illustrates a side view of the first and second couplers configured for inductive coupling.

Reference may now be had to FIG. 6. FIG. 6 illustrates another embodiment of the first coupler 21 and the second coupler 22. In the embodiment of FIG. 6, the first coupler 21 and the second coupler 22 are configured for transmitting the optical signal 17 from one section of drill pipe 12 to an adjacent section of drill pipe 12 using inductive coupling. Referring to FIG. 6, each of the first coupler 21 and the second coupler 22 includes an optical/electrical converter 60. The optical/electrical converter 60 is configured to convert the optical signal 17 to an electrical signal 61. The electrical signal 61 in turn is transmitted to the adjacent drill pipe 12 using inductive coupling via coils 62. In addition, the optical/electrical converter 60 is configured to receive the electrical signal 61 and convert this signal to the optical signal 17 for transmission via the fiber optic cable 16. Each set of coils 62 is circular and concentric with the drill pipe 12. In another embodiment, the electrical signal 61 may be transmitted to the adjacent drill pipe 12 using contacts where each contact is a ring concentric to the drill pipe 12. The coils 62 and the contact rings may be referred to as the circular signal transmission coupler.

In one embodiment, a first set of the coils 62 can be perimetrically disposed about a second set of the coils 62 at the adjacent drill pipe 12. In this embodiment, as the two drill pipes 12 are being connected, the second set of the coils 62 will slide within the first set of the coils 62 to enable communication between the two sets of coils 62.

In certain embodiments, a plurality of the communicative devices 15 may be strung along the drill string 11. In these embodiments, each communicative device 15 may be coupled to the optical telemetry network via the closest coupler 21 or coupler 22. When the communicative device 15 communicates using the electrical signal 61, the coupler 21 or the coupler 22 will include the optical/electrical converter 60 as an interface with the optical telemetry network. The coupler 21 or the coupler 22 can include connections for connecting to the communicative devices 15.

Figure 7:
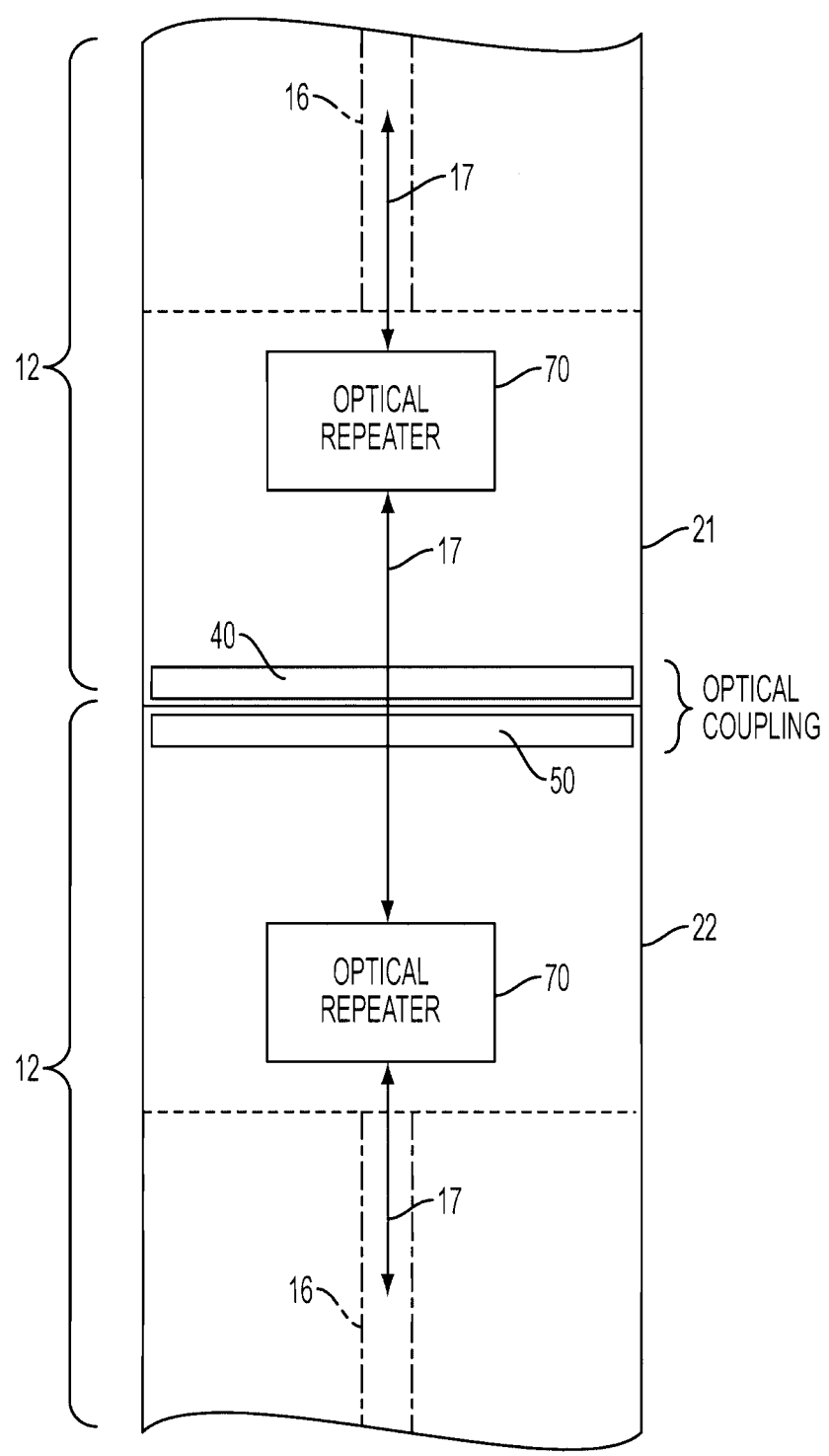
FIG. 7 illustrates the first coupler configured as a repeater.

Reference may now be had to FIG. 7. FIG. 7 illustrates each of the first coupler 21 and the second coupler 22 configured to include a repeater 70. The repeater 70 is configured to: receive the optical signal 17, amplify the optical signal 17, and transmit the amplified optical signal 17. The repeater 70 is used when attenuation of the optical signal 17 is high such that the optical signal 17 cannot be received. High attenuation may occur if a long string of communicative devices 15 is deployed.

When the optical/electrical converter 60 and/or the repeater 70 is used in the couplers 21 and 22, a distributed power supply is generally required to power each converter 60 and/or repeater 70. The distributed power supply can include local batteries or electrical power distribution conductors distributed in each section of drill pipe 12. Inductive coupling can be used to transmit power from the conductors in one drill pipe 12 to the conductors in the adjacent drill pipe 12. In one embodiment, a battery local to a powered optical device (such as the converter 60 and/or repeater 70) can be charged by a local small generator that converts the motion and/or vibration of the drill pipe 12 to electrical energy. In one embodiment, the generator includes an eccentric pendulum transmission that causes rotation of an output shaft in response to movement of the drill pipe 12. The output shaft is used to turn a small electrical generator.

Figure 8:
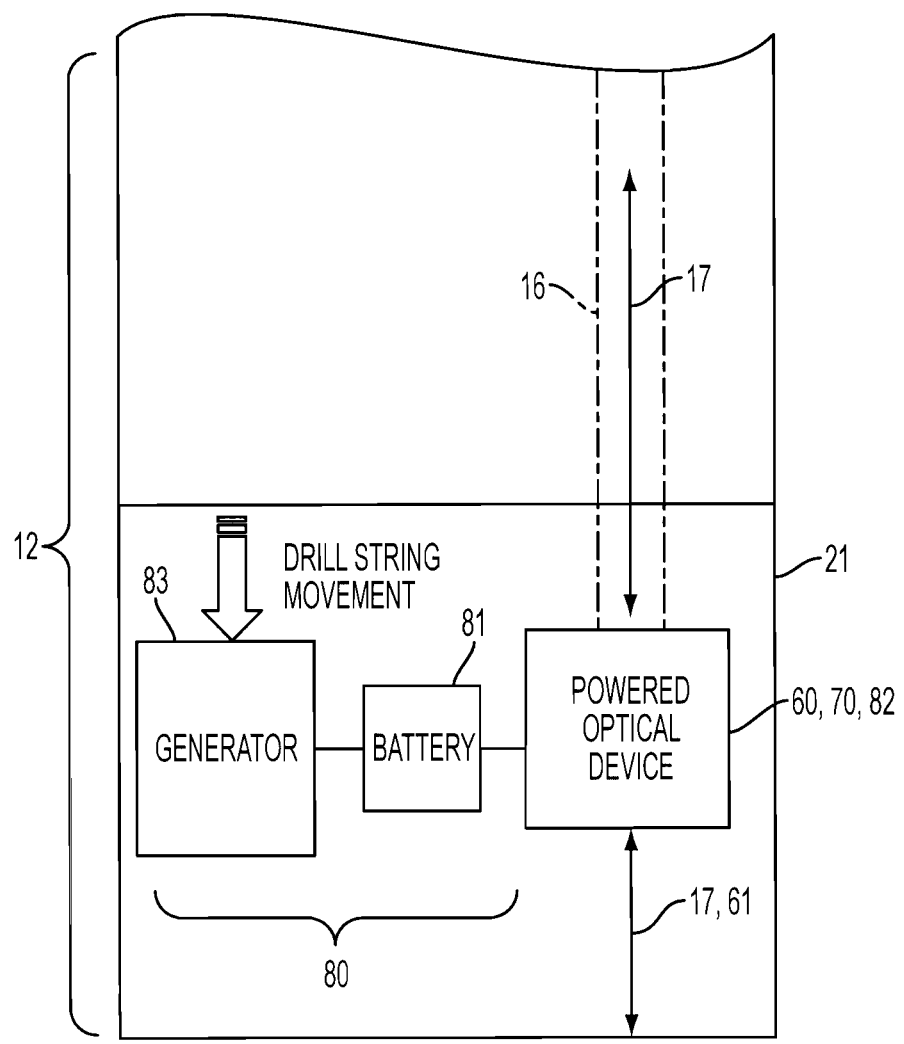
FIG. 8 illustrates an exemplary embodiment of a distributed power system.

FIG. 8 illustrates an exemplary embodiment of a distributed power system 80. The distributed power system 80 includes a battery 81 coupled to a powered optical device 82. An electrical generator 83 powered by movement of the drill pipe 12 is coupled to the battery 81. The generator 83 is configured to charge the battery 81.

Figure 9:
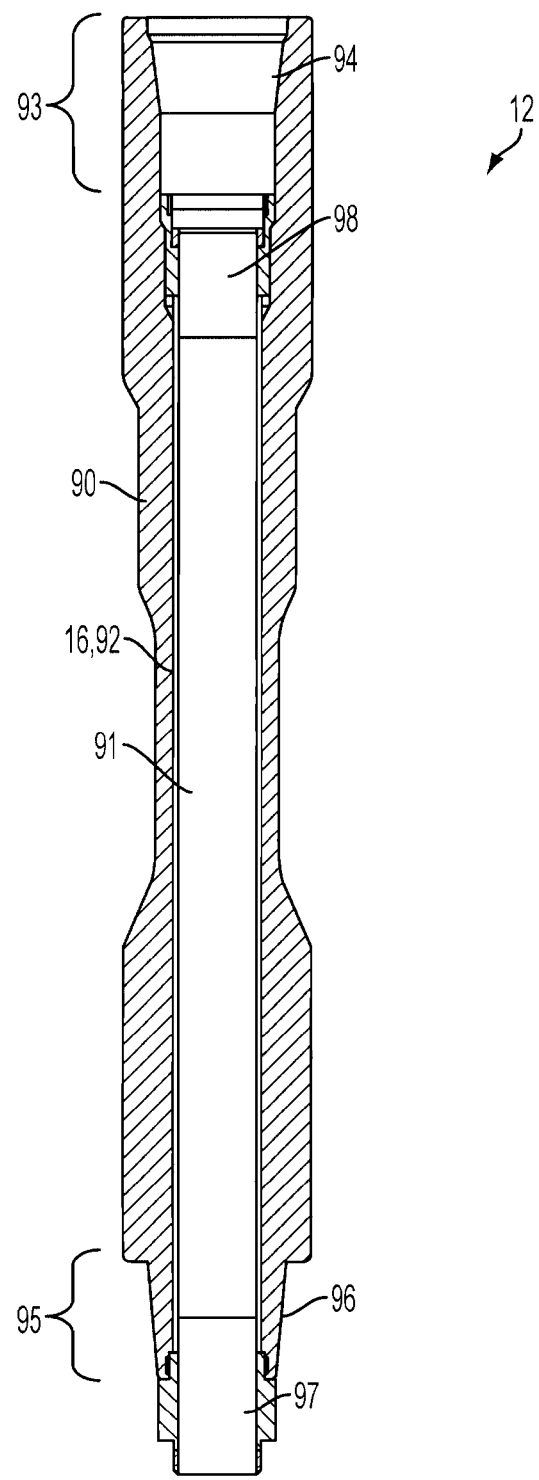
FIG. 9 illustrates an exemplary embodiment of one section of drill pipe having a tubular signal transmission medium.

Reference may now be had to FIG. 9. FIG. 9 illustrates an exemplary embodiment of one section of drill pipe having the optical signal transmission medium 16 that is shaped as a tubular and referred to as a tubular optical signal transmission medium 92. The tubular optical signal transmission medium 92 is disposed between an outer wall 90 of the drill pipe 12 and an inner tubular liner 91. The inner tube 91 provides a barrier between the tubular optical signal transmission medium 92 and the drilling fluid 4.

The tubular optical signal transmission medium 92 can be made from one or more optical fibers being embedded in at least one groove on the outside of a tube. The tube for the tubular optical signal transmission medium 92 can be made of metal or a polymer. In another embodiment, the tubular optical signal transmission medium 92 is a tube with optical fibers embedded in a polymer matrix, the fibers being continuous between the end faces of the tube. In one non-limiting embodiment, the tube is manufactured by a process referred to as pultrusion. Non-limiting embodiments of the matrix include a duromer (e.g., an epoxy) or polyaryletheretherketone (PEEK). The optical fibers embedded in the tube material can fill a large percentage of the volume of the wall of the tube (i.e., at least eighty percent) in one embodiment. In an alternative embodiment, the tube material itself is the tubular optical signal transmission medium 92. In this embodiment, the tube material has a high optical transmissibility and maybe made of an optical grade polymer as a non-limiting example.

Each end face of the tubular optical signal transmission medium 92 is secured to an optical coupler. Two mated optical couplers provide a path for the optical signal 17 to cross from the tubular optical signal transmission medium 92 at one section of the drill pipe 12 to the tubular optical signal transmission medium 92 at a connected section of the drill pipe 12.

The outer wall 90 includes a box end 93 having box end threads 94 and a pin end 95 having pin end threads 96. The pin end threads 96 at one section of the drill pipe 12 are configured to engage the box end threads 94 at a similar adjacent section of the drill pipe 12. Another type of connection in lieu of threads may also be used.

The drill pipe 12 in the embodiment of FIG. 9 includes a box end optical coupler 98 disposed at the box end 93 and a pin end optical coupler 97 disposed at the pin end 95. The optical couplers 97 and 98 may be secured to the outer wall 90 by at least one of threads, adhesive and friction as non-limiting examples. The pin end optical coupler 97 and the box end optical coupler are in optical communication with the tubular optical signal transmission medium 92. The pin end optical coupler 97 at one end of a section of the drill pipe 12 is configured to optically communicate with the box end optical coupler 98 at a similar adjacent section the of the drill pipe 12 when the two sections of the drill pipe 12 are connected. Thus, the optical signal 17 can be transmitted from the tubular optical signal transmission medium 92 at one section of the drill pipe 12 to the tubular optical signal transmission medium 92 at an adjacent section of the drill pipe 12.

FIG. 9 illustrates the drill pipe 12 in a vertical orientation such that the box end 93 faces uphole and the pin end 95 faces downhole. Alternatively, the orientation can be reversed with the box end 93 facing downhole and the pin end facing uphole.

Figure 10:
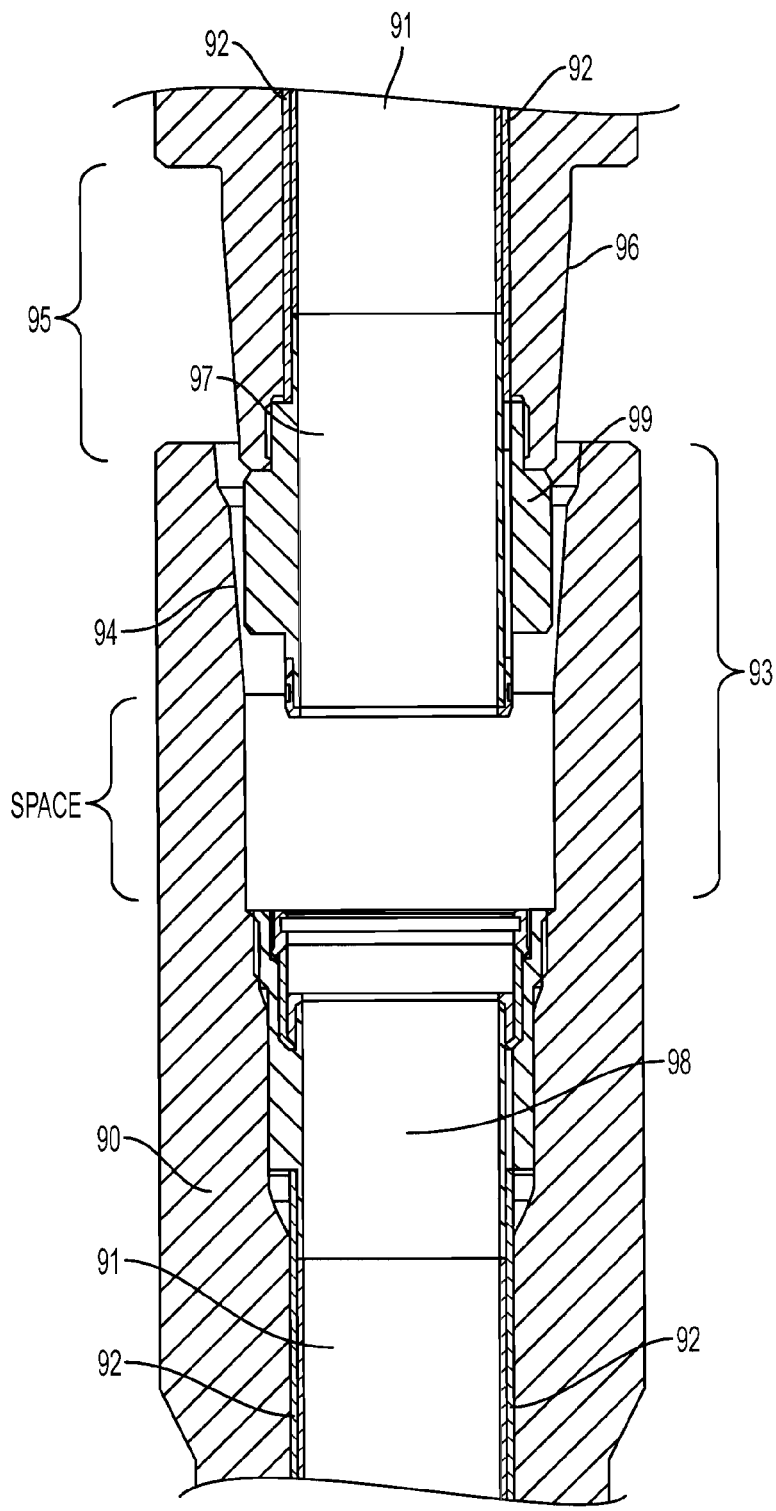
FIG. 10 illustrates an exemplary embodiment of a pin end optical coupler and a box end optical coupler about to be coupled.

Reference may now be had to FIG. 10. FIG. 10 illustrates an exemplary embodiment of the pin end optical coupler 97 and the box end optical coupler 98 about to be coupled in the box end 93. The pin end optical coupler 97 includes an alignment (or "stabbing") guide 99 to provide proper alignment of the pin end optical coupler 97 with respect to the box end optical coupler 98. As the pin end optical coupler 97 is inserted into the box end 93, the alignment guide 99 engages with a similar shaped interior surface of the box end 93 to provide the proper alignment.

Figure 11:
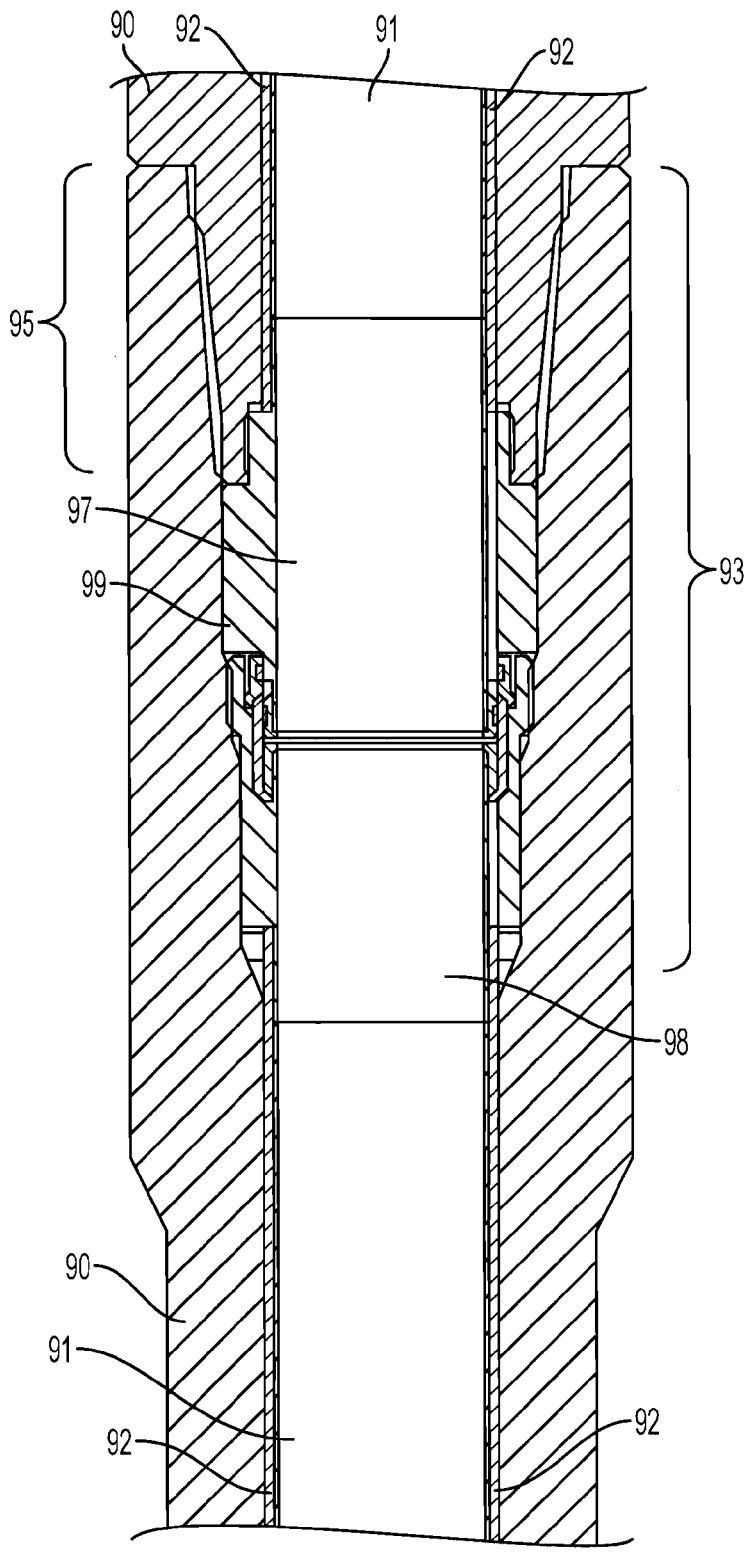
FIG. 11 illustrates an exemplary embodiment of the pin end optical coupler coupled to the box end optical coupler.

Reference may now be had to FIG. 11. FIG. 11 illustrates an exemplary embodiment of the pin end optical coupler 97 coupled to the box end optical coupler 98. As shown in FIG. 11, the pin end 95 of the above section of the outer wall 90 mates with the box end 93 of the lower section of the outer wall 90.

Figure 12:
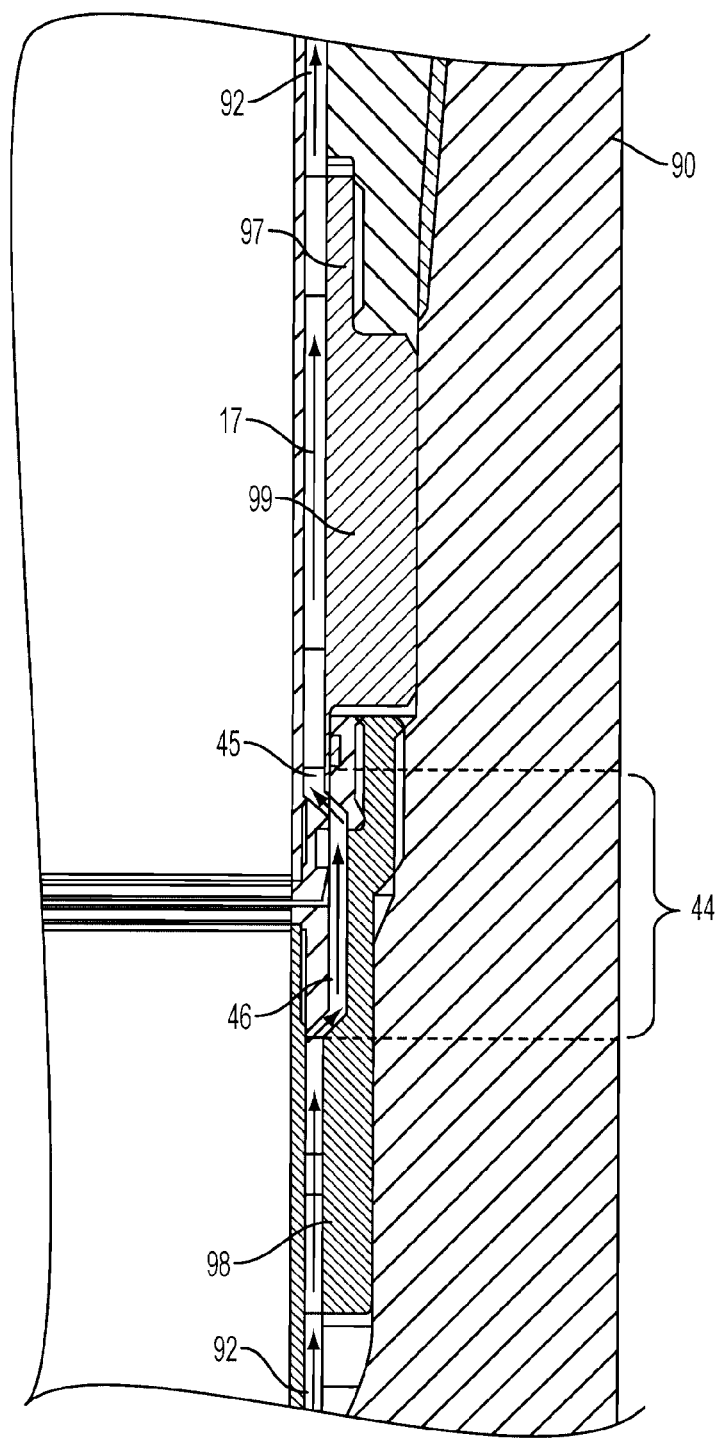
FIG. 12 depicts aspects of transmission of an optical signal between the pin end optical coupler and the box end optical coupler.

Reference may now be had to FIG. 12 depicting aspects of transmission of the optical signal 17 between the pin end optical coupler 97 and the box end optical coupler 98. For clarity, FIG. 12 shows the optical signal 17 traveling in one direction. However, for bi-directional communication, the optical signal 17 can also travel in the opposite direction. The optical signal 17 bridges the optical couplers 97 and 98 using a light deflector 44. The light deflector 44 is circular, surrounding (i.e., perimetrically disposed about) interior portions of the optical couplers 97 and 98. The light deflector 44 may also be described as being concentrically disposed within the optical couplers 97 and 98 and concentric to the drill pipe 12. Both optical couplers 97 and 98 are concentric to the drill pipe 12. As shown in FIG. 12, the optical signal 17 is deflected around or over the joint or interface between the optical couplers 97 and 98.

Still referring to FIG. 12, the light deflector 44 includes a pin end light deflector ring 45 secured to the pin end optical coupler 97 and a box end light deflector sleeve 46 secured to the box end optical coupler 98. The box end light deflector sleeve 46 is configured to fit, slip, or slide over the pin end light deflector ring 45 to provide an optical path between the optical couplers 97 and 98. When the pin end optical coupler 97 is coupled to the box end optical coupler 98, a portion of the box end light deflector sleeve 46 will be perimetrically disposed about the pin end light deflector ring 45 to enable optical communication between the ring 45 and the sleeve 46. The light deflector 44 has high optical transmissibility. Non-limiting embodiments of materials from which the light deflector 44 is made includes quartz glass, sapphire, or an optical grade polymer. If the optical grade polymer is used, then the polymer may be hard coated to avoid early deterioration from scratching.

Figure 13:
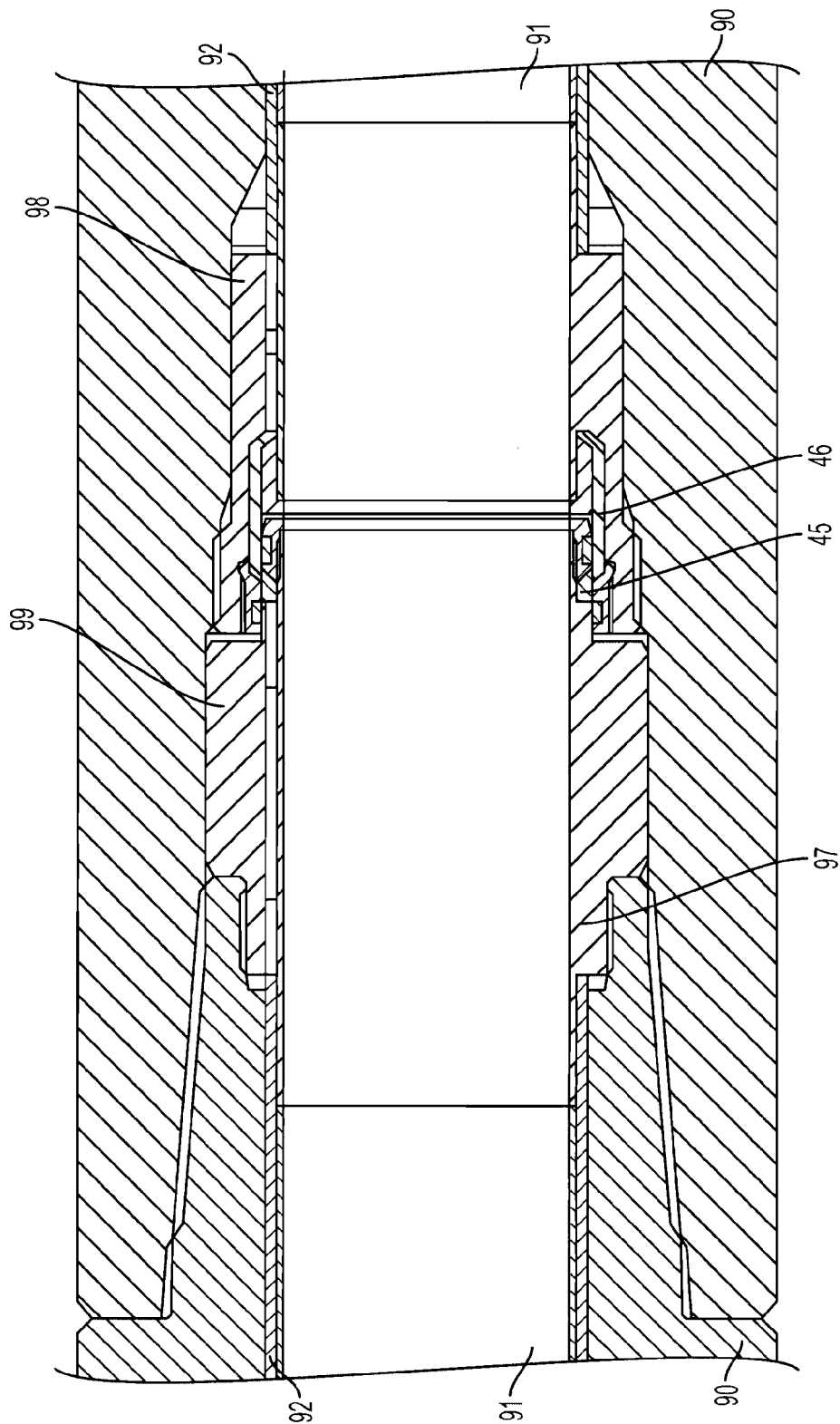
FIG. 13 illustrates a cross-sectional view of the pin end optical coupler coupled to the box end optical coupler.

Reference may now be had to FIG. 13. FIG. 13 illustrates a cross-sectional view of the pin end optical coupler 97 coupled to the box end optical coupler 98.

Figure 14:
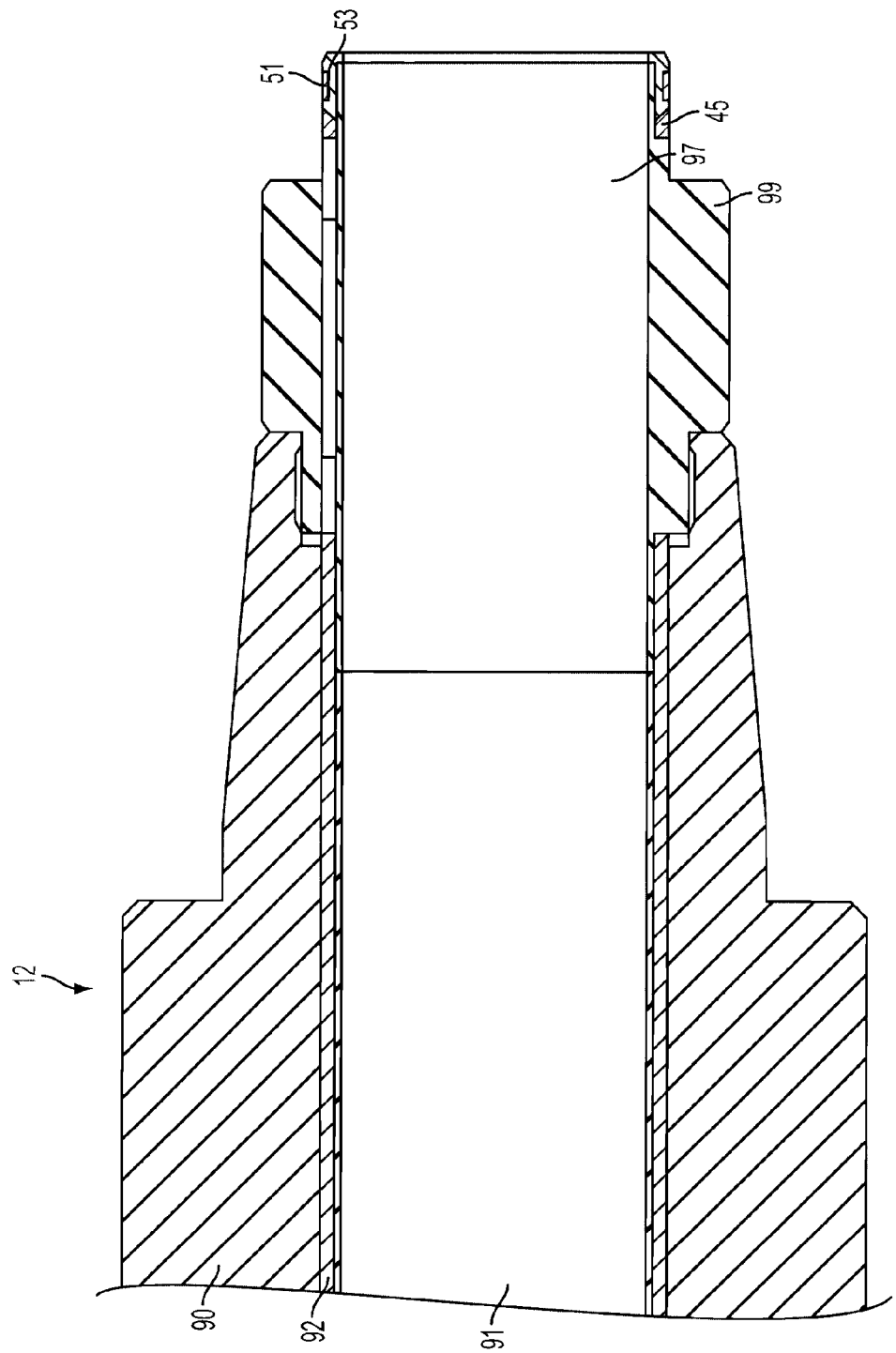
FIG. 14 depicts aspects of the pin end optical coupler coupled to an optical transmission medium and disposed at a section of drill pipe.

Reference may now be had to FIG. 14. FIG. 14 depicts aspects of the pin end optical coupler 97 coupled to the tubular optical signal transmission medium 92 and disposed at a section of the drill pipe 12. In the embodiment of FIG. 14, the pin end optical coupler 97 includes a pin end wiper ring 51 disposed in a pin end wiper ring groove 53. The pin end wiper ring 51 is configured to wipe debris from the inner diameter of the light deflector sleeve 46 during mating (also referred to as "make-up") of the pin end optical coupler 97 to the box end optical coupler 98.

Figure 15:
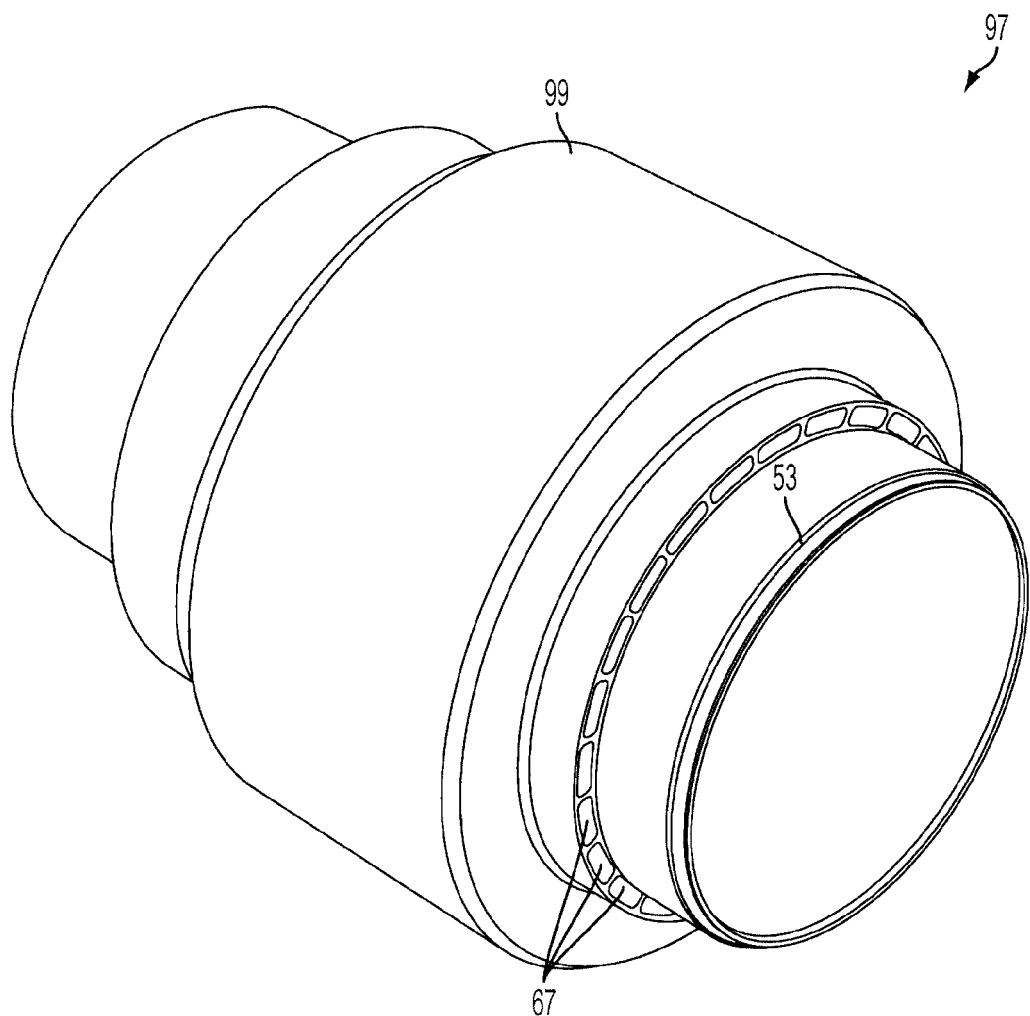
FIG. 15 illustrates a three-dimensional view of the pin end optical coupler.

Reference may now be had to FIG. 15. FIG. 15 illustrates a three-dimensional view of the pin end optical coupler 97. In the embodiment of FIG. 15, the pin end optical coupler 97 includes a plurality of pin end light channels 67. The plurality of pin end light channels 67 is configured to transmit the optical signal 17 between the tubular optical signal transmission medium 92 and the pin end light deflector 45. Each light channel 67 may be mirror plated to enhance transmission of the optical signal 17. In addition, the plurality of pin end light channels 67 may be potted with a high optical transmissibility polymer.

Figure 16:
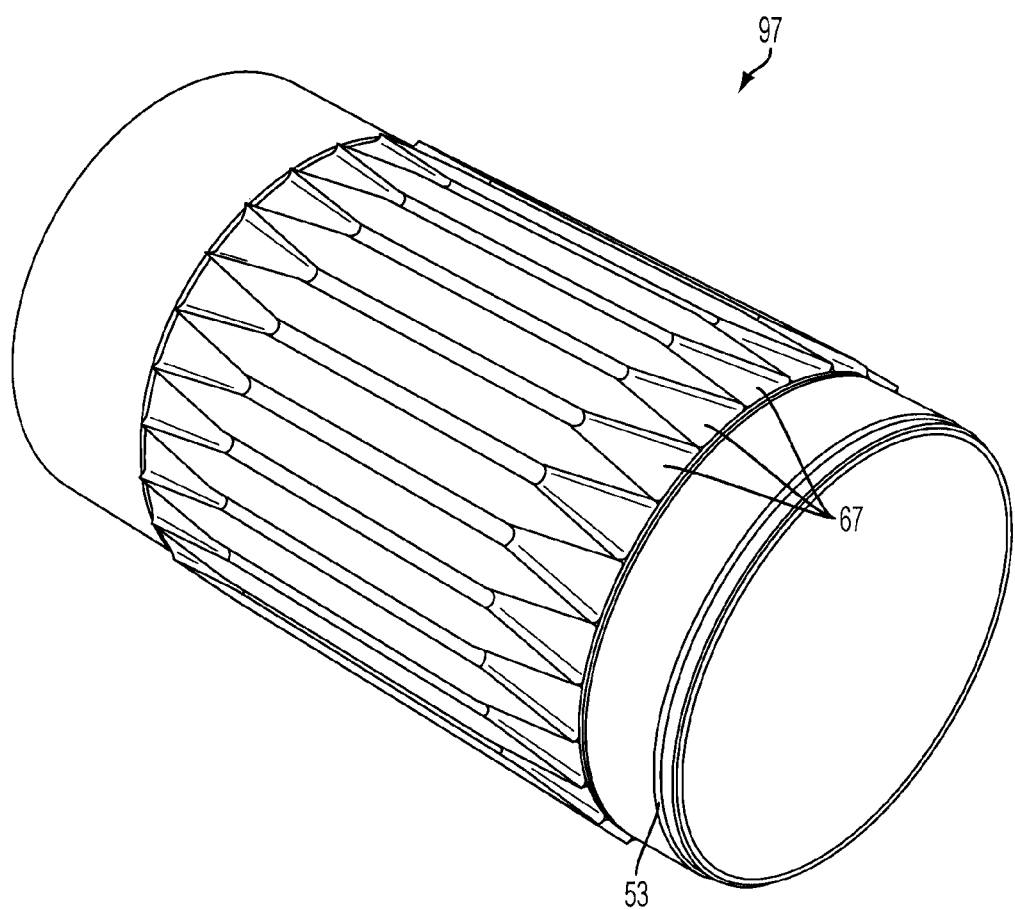
FIG. 16 illustrates a three-dimensional view of an interior portion of the pin end optical coupler.

Reference may now be had to FIG. 16. FIG. 16 illustrates a three-dimensional view of an interior portion of the pin end optical coupler 97. Ribs between light channels 67 provide support for an outer structure of the pin end optical coupler 97 such as the alignment guide 99.

Figure 17:
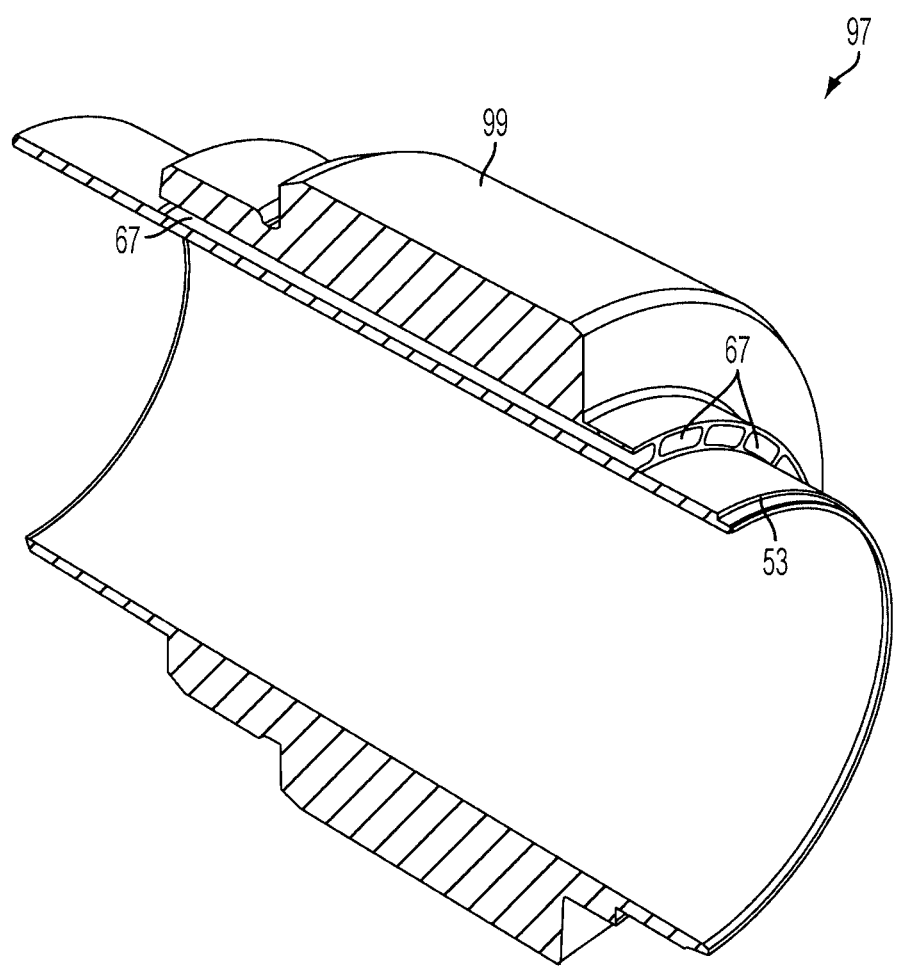
FIG. 17 illustrates a three-dimensional cross-sectional view of the pin end optical coupler.

Reference may now be had to FIG. 17. FIG. 17 illustrates a three-dimensional cross-sectional view of the pin end optical coupler 97.

Figure 18:
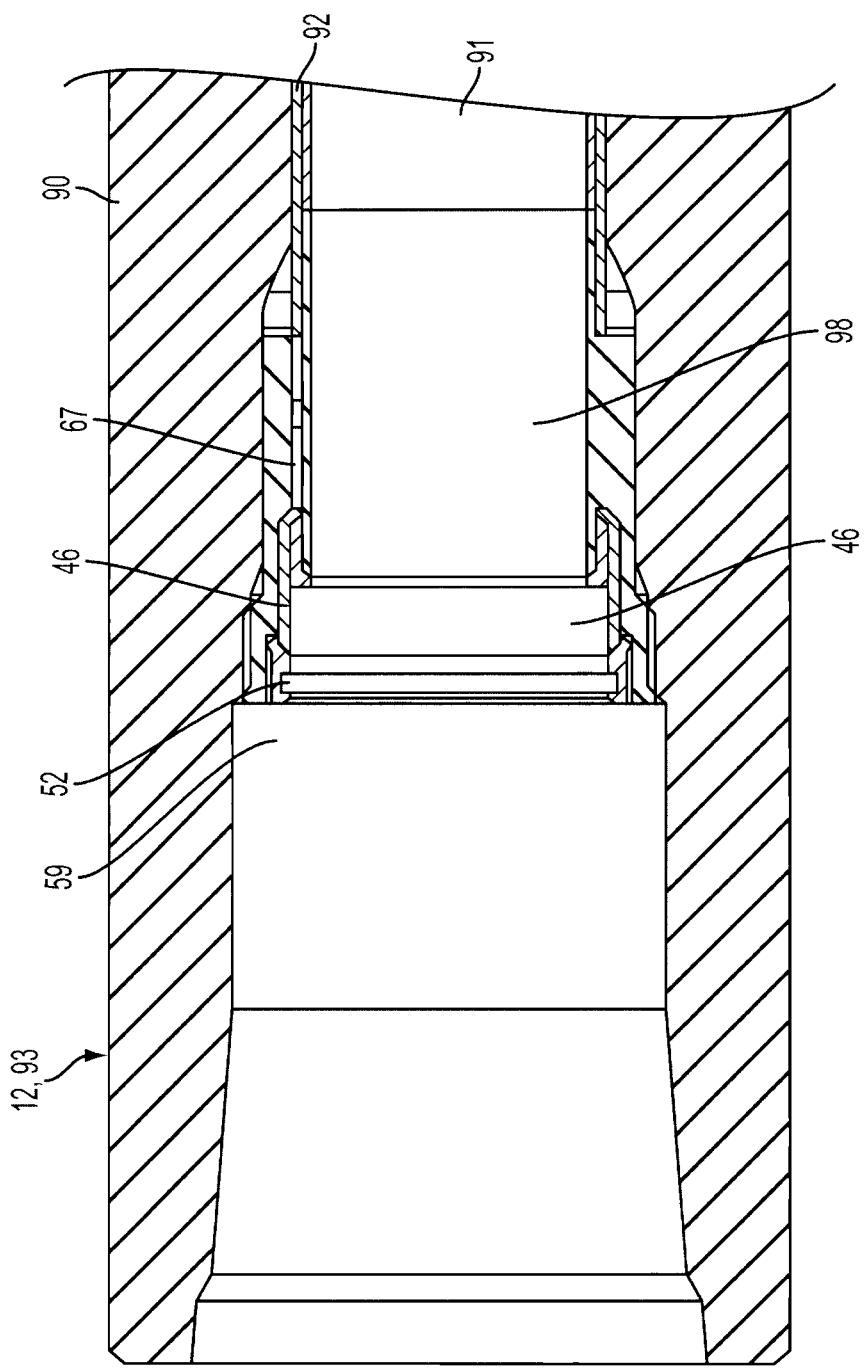
FIG. 18 depicts aspects of the box end optical coupler coupled to the optical transmission medium and disposed in the section of drill pipe.

Reference may now be had to FIG. 18. FIG. 18 depicts aspects of the box end optical coupler 98 coupled to the tubular optical signal transmission medium 92 and disposed in the box end 93 section of the drill pipe 12. The box end optical coupler 98 in the embodiment of FIG. 18 includes a box end wiper ring 52. The box end wiper ring 52 is configured to wipe debris from the outer diameter of the pin end light deflector ring 45 during make-up of the pin end optical coupler 97 to the box end optical coupler 98.

Figure 19:
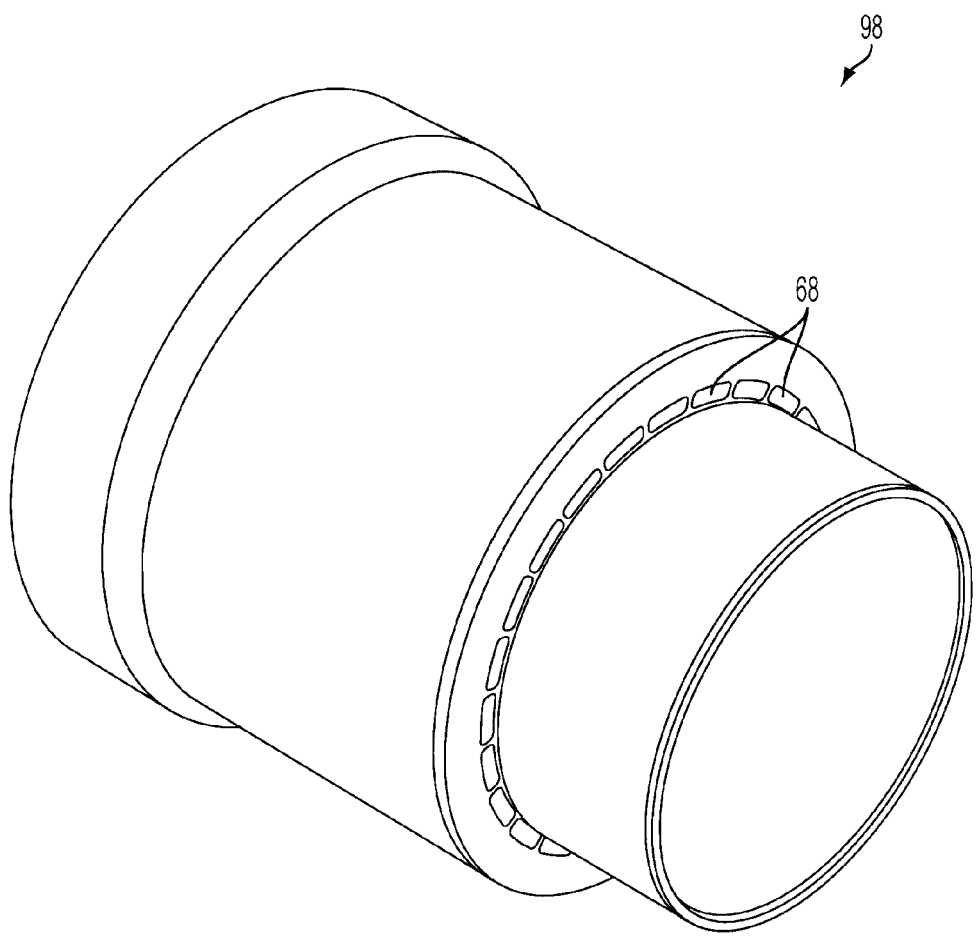
FIG. 19 illustrates a three-dimensional view of the box end optical coupler.

Reference may now be had to FIG. 19. FIG. 19 illustrates a three-dimensional view of the box end optical coupler 98. In the embodiment of FIG. 19, the box end light coupler 98 includes a plurality of box end light channels 68 that are similar to the plurality of pin end light channels 67. The plurality of box end light channels 68 is configured to transmit the optical signal 17 between the tubular optical signal transmission medium 92 and the box end light deflector 46. Each light channel 68 may be mirror-plated to enhance transmission of the optical signal 17. In addition, the plurality of box end light channels 68 may be potted with a high optical transmissibility polymer.

Figure 20:
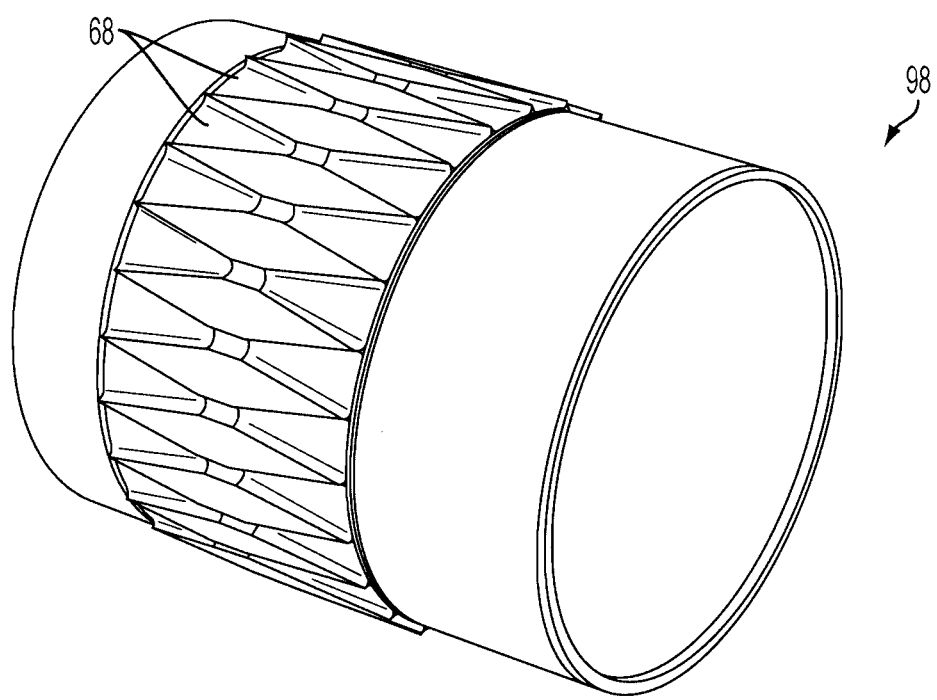
FIG. 20 illustrates a three-dimensional view of an interior portion of the box end optical coupler.

Reference may now be had to FIG. 20. FIG. 20 illustrates a three-dimensional view of an interior portion of the box end optical coupler 98. Ribs between box end light channels 68 provide support for an outer structure of the box end optical coupler 98.

Figure 21:
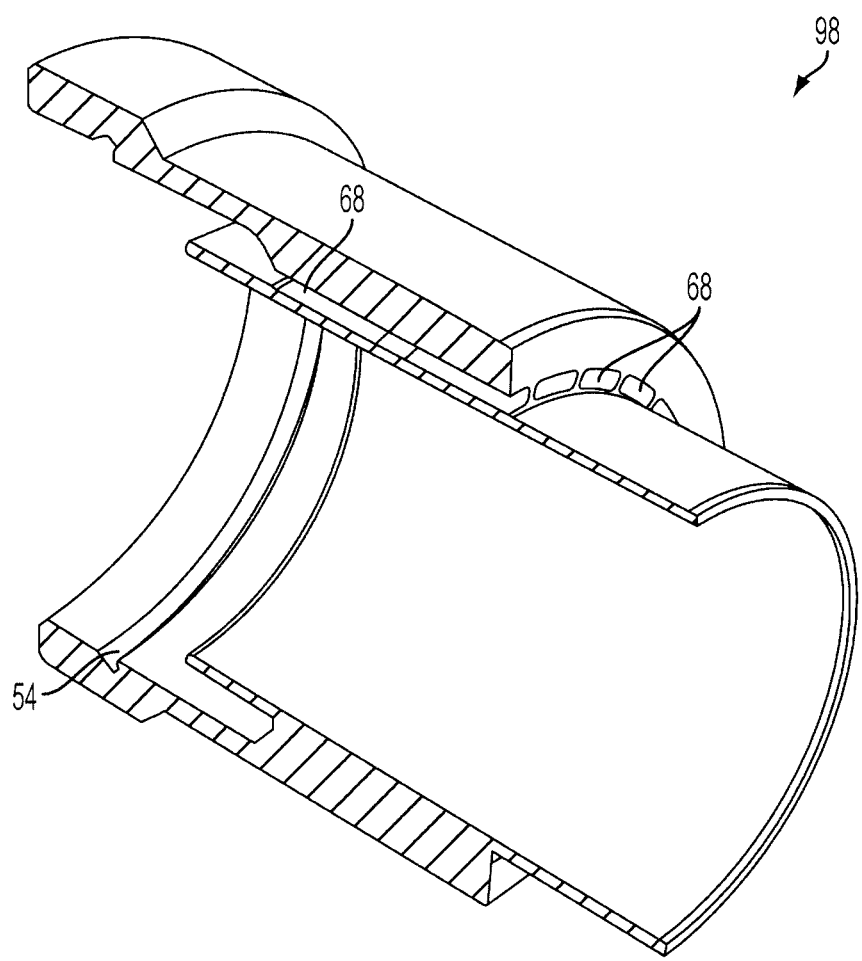
FIG. 21 illustrates a three-dimensional cross-sectional view of the box end optical coupler.

Reference may now be had to FIG. 21. FIG. 21 illustrates a three-dimensional cross-sectional view of the box end optical coupler 98. In the embodiment of FIG. 21, the box end optical coupler 98 includes a box end wiper ring groove 54 into which the box end wiper ring 52 is disposed.

The optical telemetry network disclosed herein provides at least a data rate equivalent to that provided by conventional MWD/LWD telemetry systems. As a minimum, half duplex (or burst modems) may be used for bi-directional communications using one frequency. With high enough bandwidth and signal to noise ratio, the optical signal 17 can be modulated on different frequencies to provide full duplex (or multi-mode) communications.

In the embodiments presented above, the optical transmission medium 16 is disposed at drill pipe 12 in a drill string 11. The teachings presented herein are also applicable to any tubular disposed in the borehole 1.

Figure 22:
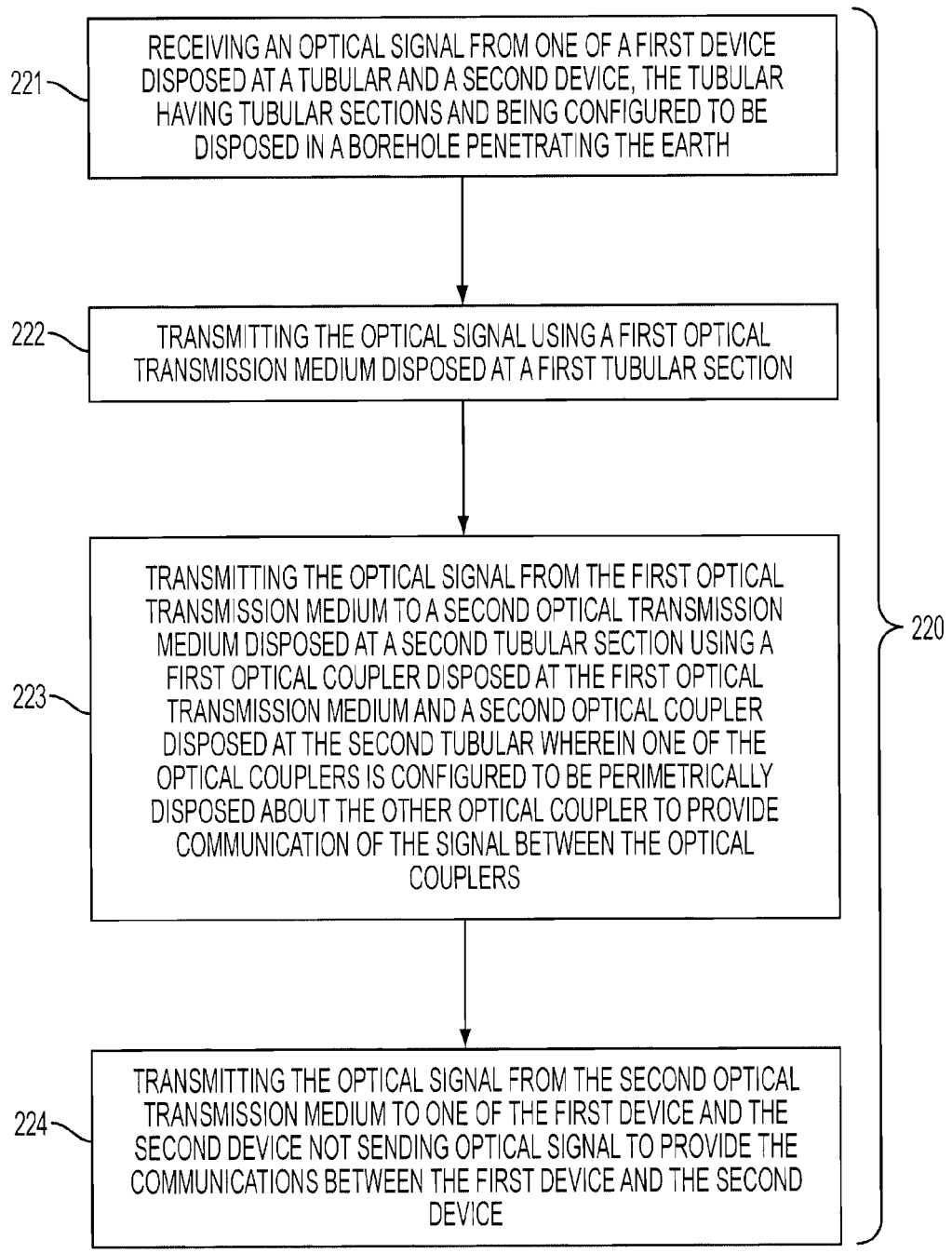
FIG. 22 presents one example of a method for providing communications between a first device and a second device disposed at the drill string.

FIG. 22 presents one example of a method 220 for providing communications between a first device and a second device disposed at a tubular. The method 220 calls for (step 221) receiving the optical signal 17 from one of the first device and the second device. Further, the method 220 calls for (step 222) transmitting the optical signal 17 using a first optical transmission medium 16 disposed at a first tubular section. Further, the method 220 calls for (step 223) transmitting the optical signal 17 from the first optical transmission medium 16 to a second optical transmission medium 16 disposed at a second tubular section using a first optical coupler disposed at the first tubular section and a second optical coupler disposed at the second tubular section wherein one of the optical couplers is perimetrically disposed about the other optical coupler. Further, the method 90 calls for (step 224) transmitting the optical signal 17 from the second optical transmission medium 16 to one of the first device and the second device not sending the signal to provide the communications between the first device and the second device.

In support of the teachings herein, various analysis components may be used, including a digital and/or an analog system. For example, the topside equipment 7, the downhole electronics 13, the communicative devices 15, or the powered optical devices 82 may include the digital and/or analog system. The system may have components such as a processor, storage media, memory, input, output, communications link (wired, wireless, optical or other), user interfaces, software programs, signal processors (digital or analog) and other such components (such as resistors, capacitors, inductors and others) to provide for operation of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure. In addition, alternate apparatus and methods for MWD/LWD communications may be provided for parallel operation or as backup to the optical telemetry system. Non-limiting examples of the alternate apparatus and methods include mud pulse, acoustic, electromagnetic and electrical.

Further, various other components may be included and called upon for providing for aspects of the teachings herein. For example, a power supply (e.g., at least one of a generator, a remote supply and a battery), motive force (such as a translational force, propulsional force or a rotational force), magnet, electromagnet, sensor, electrode, transmitter, receiver, transceiver, antenna, controller, optical unit, electrical unit, electromechanical unit, or connectors may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "perimetrically" as used herein relates to surrounding or forming a perimeter. The term "couple" relates to coupling two devices either directly or indirectly through an intermediate device.

It will be recognized that the various components or technologies may provide certain necessary or beneficial functionality or features. Accordingly, these functions and features as may be needed in support of the appended claims and variations thereof are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed:

1. An apparatus for providing communications between a first device disposed at a tubular and a second device, the tubular comprising tubular sections and configured to be disposed in a borehole penetrating the earth, the apparatus comprising:
a first optical coupler configured to be coupled to a first tubular section and configured to be in optical communication with the first device using a first optical transmission medium disposed at the first tubular section; and
a second optical coupler configured to be coupled to a second tubular section and configured to be in optical communication with the second device using a second optical transmission medium disposed at the second tubular section;
wherein the first optical coupler is configured to be perimetrically disposed about the second optical coupler to be in communication with the second optical coupler to provide the communications between the first device and the second device, and at least one of the first optical coupler and the second optical coupler comprises an optical repeater configured to amplify an optical signal, the second optical coupler is configured to be inserted into the first optical coupler, and the first optical coupler comprises a light deflector sleeve in optical communication with first optical transmission medium and the second optical coupler comprises a light deflector ring in optical communication with the second optical transmission medium, the light deflector ring being configured to slide into and be in optical communication with the light deflector sleeve to deflect light over an interface between the first optical coupler and the second optical coupler.

2. The apparatus of claim 1, wherein each of the first optical transmission medium and the second optical transmission medium forms a tube.

3. The apparatus of claim 2, wherein each of the first optical transmission medium and the second optical transmission medium comprises one or more optical fibers embedded in a polymer matrix.

4. The apparatus of claim 1, wherein an inner surface of the light deflector sleeve is configured to be perimetrically disposed about an outer surface of the light ring.

5. The apparatus of claim 1, wherein each of the light deflector ring and the light deflector sleeve are made from at least one of quartz glass, sapphire, and optical grade polymer.

6. The apparatus of claim 1, wherein the second optical coupler comprises a wiper ring configured to wipe an inner surface of the light deflector sleeve when the second optical coupler is inserted into the first optical coupler.

7. The apparatus of claim 1, wherein the first optical coupler comprises first light channels optically connecting the light deflector sleeve to the first optical transmission medium and the second optical coupler comprises second light channels optically connecting the light deflector ring to the second optical transmission medium.

8. The apparatus of claim 7, wherein each of the first light channels and the second light channels is at least one of mirror-plated and potted with an optical transmissible polymer.

9. The apparatus of claim 1 wherein the second optical coupler comprises an alignment guide configured to engage the first optical coupler in order to align the second optical coupler with the first optical coupler.

10. The apparatus of claim 1, wherein at least one of the first tubular section and the second tubular section comprises a powered optical device connected to a distributed power system.

11. The apparatus of claim 1, wherein the first optical coupler comprises a first coil concentric with the first tubular section and the second optical coupler comprises a second coil concentric with the second tubular section, the first coil being configured to inductively couple with the second coil to provide the communications.

12. The apparatus of claim 11, wherein the first optical coupler further comprises a first optical/electrical converter coupling the first coil to the first optical transmission medium and the second optical coupler further comprises a second optical/electrical converter coupling the second coil to the second optical transmission medium.

13. The apparatus of claim 1, wherein the tubular is a drill string.

14. The apparatus of claim 1, wherein the first optical transmission medium is an optical fiber disposed in a conduit affixed internally to the first tubular section and the second optical transmission medium is an optical fiber disposed in a conduit affixed internally to the second tubular section.

15. The apparatus of claim 1, wherein the first optical coupler is configured to be concentrically coupled to the first tubular section and the second optical coupler is configured to be concentrically coupled to the second tubular section.

16. An apparatus for providing communications between a first device disposed at a tubular and a second device, the tubular comprising tubular sections and configured to be disposed in a borehole penetrating the earth, the apparatus comprising:
a first tubular section;
a second tubular section;
a first optical coupler disposed at the first tubular section and configured to be in optical communication with the first device using a first optical transmission medium disposed at the first tubular section; and
a second optical coupler disposed at the second tubular section and configured to be in optical communication with the second device using a second optical transmission medium disposed at the second tubular section;
wherein the first optical coupler is configured to be perimetrically disposed about the second signal transmission coupler to be in communication with the second optical coupler to provide the communications between the first device and the second device, the first optical coupler comprises a light deflector sleeve in optical communication with first optical transmission medium and the second optical coupler comprises a light deflector ring in optical communication with the second optical transmission medium, the light deflector ring being configured to slide into and be in optical communication with the light deflector sleeve to deflect light over an interface between the first optical coupler and the second optical coupler.

17. The apparatus of claim 16, wherein the second device is disposed external to the tubular.

18. The apparatus of claim 17, wherein the second device is disposed at the surface of the earth.

19. The apparatus of claim 16, wherein the first optical coupler is concentric to the first tubular section and the second optical coupler is concentric to the second tubular section.

20. A method for providing communications between a first device disposed at a tubular and a second device, the tubular comprising tubular sections and configured to be disposed in a borehole penetrating the earth, the method comprising:
receiving a signal from one of the first device or the second device;
transmitting the signal using a first optical transmission medium disposed at a first tubular section;
transmitting the signal from the first optical transmission medium to a second optical transmission medium disposed at a second tubular section using a first optical coupler disposed at the first tubular section and a second optical coupler disposed at the second tubular section, at least one of the first optical coupler and the second optical coupler comprising an optical repeater configured to amplify the signal; and
transmitting the signal from the second optical transmission medium to an other of the first device or the second device that is not the one of the first device or the second device sending the signal to provide the communications between the first device and the second device;
wherein one of the optical couplers is configured to be perimetrically disposed about the other optical coupler to provide communication of the signal between the optical couplers, the second optical coupler is configured to be inserted into the first optical coupler, and the first optical coupler comprises a light deflector sleeve in optical communication with first optical transmission medium and the second optical coupler comprises a light deflector ring in optical communication with the second optical transmission medium, the light deflector ring being configured to slide into and be in optical communication with the light deflector sleeve to deflect light over an interface between the first optical coupler and the second optical coupler.

21. The method of claim 20, wherein the first optical coupler and the second optical coupler are concentric to each other.

* * * * *